United States Patent [19]

Middlebrook

[11] 4,126,662

[45] Nov. 21, 1978

[54] METHOD FOR LIMITING GLOSS OF INJECTION MOLDABLE POLYMERS

[75] Inventor: Terence C. Middlebrook, Bartlesville, Okla.

[73] Assignee: Phillips Petroleum Co., Inc., Bartlesville, Okla.

[21] Appl. No.: 621,100

[22] Filed: Oct. 9, 1975

[51] Int. Cl.² .................. B29D 1/00; C08L 53/02
[52] U.S. Cl. .................. 264/328; 260/17.4 R; 260/17.4 CL; 260/876 R; 260/876 B; 260/880 B; 264/54; 264/211; 264/DIG. 5; 264/DIG. 14; 264/DIG. 83
[58] Field of Search .................. 264/51, DIG. 83, 53, 264/DIG. 17, 329, 328, 211, DIG. 5, 54; 260/889, 17.4 R, 17.4 CL, 880 B, 884, 894, 876 R, 876 B

[56] References Cited

U.S. PATENT DOCUMENTS

| | | | |
|---|---|---|---|
| 2,638,457 | 5/1953 | Gates | 260/889 |
| 2,864,130 | 12/1958 | Beare | 264/329 X |
| 3,162,703 | 12/1964 | Eyles | 264/DIG. 83 |
| 3,268,636 | 8/1966 | Angell | 264/DIG. 83 |
| 3,294,868 | 12/1966 | Pritchard | 260/884 X |
| 3,306,960 | 2/1967 | Weissman et al. | 264/DIG. 17 |
| 3,651,187 | 3/1972 | Cessna | 264/211 X |
| 3,678,134 | 7/1972 | Middlebrook | 260/880 B X |
| 3,689,595 | 9/1972 | Gwinn | 260/880 B X |
| 3,694,523 | 9/1972 | Rollmann et al. | 260/880 B |
| 3,699,184 | 10/1972 | Taylor et al. | 260/880 B X |
| 3,706,817 | 12/1972 | Wald et al. | 260/880 B |
| 3,776,989 | 12/1973 | Annis et al. | 264/53 |
| 3,810,957 | 5/1974 | Lunk | 260/880 B X |
| 3,817,904 | 6/1974 | Gagle et al. | 260/880 B X |
| 3,819,767 | 6/1974 | Shimomura et al. | 260/880 B |
| 3,823,109 | 7/1974 | Middlebrook | 260/880 B X |
| 3,823,213 | 7/1974 | Stastny et al. | 264/DIG. 17 |
| 3,826,776 | 7/1974 | Wright | 260/880 B X |
| 3,839,501 | 10/1974 | Wei et al. | 260/894 X |
| 3,840,493 | 10/1974 | Marrs et al. | 260/880 B X |
| 3,842,145 | 10/1974 | Hsieh | 260/880 B X |
| 3,850,474 | 11/1974 | Welch | 260/876 B X |
| 3,853,796 | 12/1974 | Oldack et al. | 260/17.5 X |
| 3,888,810 | 6/1975 | Shinomura | 260/17.4 CL X |
| 3,906,057 | 9/1975 | Durst | 260/880 B X |
| 3,906,058 | 9/1975 | Durst | 260/880 B X |
| 3,907,931 | 9/1975 | Durst | 260/880 B X |
| 3,937,760 | 2/1976 | Cole et al. | 260/880 B |
| 3,950,292 | 4/1976 | Cooper | 260/880 B X |
| 3,953,543 | 4/1976 | Futamura et al. | 260/880 B |
| 4,000,216 | 12/1976 | Lang | 260/876 R X |

FOREIGN PATENT DOCUMENTS

| | | | |
|---|---|---|---|
| 46-40788 | 12/1971 | Japan | 264/DIG. 83 |
| 1,025,295 | 4/1966 | United Kingdom | 260/880 B |

OTHER PUBLICATIONS

Zielinski, A. R. "Injection Molding Expandable Polystyrene Beads." In *Plastics World*, Jan. 1962, pp. 18–21.
Czerski, J. "Injection-Moulded Foams," In *Plastics & Polymers*, Dec. 1971, pp. 406–411.
Bradt, Rexford "How and Why to Use Glass-Reinforced Injection Molding Compounds," In *Modern Plastics*, Mar. 1958, pp. 100–102, 192, 194.

*Primary Examiner*—Philip Anderson

[57] ABSTRACT

An injection molded polymer having limited surface gloss is provided by preparing an admixture of an injection moldable polymer substrate and an additive chosen from among the group consisting of finely divided textile fibers, finely divided hydrocarbon polymers, and blowing agents and injection molding an article from the admixture. In the embodiment of the invention employing blowing agents the admixing is carried out at a temperature below that at which the blowing agent is activated and the injection molding is carried out at a temperature sufficient to activate the decomposition of the blowing agent.

9 Claims, No Drawings

METHOD FOR LIMITING GLOSS OF INJECTION MOLDABLE POLYMERS

BACKGROUND OF THE INVENTION

This invention relates to injection moldable polymers. In one of its aspects this invention relates to additives for injection moldable polymers. In another of its aspects this invention relates to the alteration of physical properties of polymers. In yet another of its aspects the invention relates to soling and heels for shoes.

Solution polymerized elastomers are becoming increasing by important in the rubber industry in view of the diversity of available grades, the potential in solution polymerization of producing a polymer designed or tailored to meet preset requirements and the capability of obtaining polymers of uniform quality. Solution polymers, upon injection molding or extrusion, can readily acquire a smooth, glossy surface and this can be undesirable in some applications. An example is the injection molding of shoe soling or heels where a dull or nonlustrous surface reminiscent of natural rubber soling is often desired. The present invention affords a simple but effective method for obtaining an injection moldable polymer such as solution polymerized rubber desirably modified by limiting its gloss.

It is therefore an object of this invention to provide compositions that upon being injection molded will produce articles having limited surface gloss. It is another object of the invention to provide a method for limiting the gloss of injection molded polymers. It is still another object of this invention to provide injection molded polymeric articles having limited surface gloss.

Other objects, aspects and the various advantages of this invention will become apparent upon reading the specification and the appended claims.

STATEMENT OF THE INVENTION

According to this invention articles made of injection molded polymers are produced having limited gloss by a method in which an admixture is prepared of an injection moldable polymer substrate and an additive chosen from among the group consisting of finely divided textile fibers, finely divided hydrocarbon polymers, and blowing agents with the admixture then being injection molded. In the embodiment of the invention employing a blowing agent as the additive the admixing must be carried out at a temperature below that at which the decomposition of the blowing agent is activated and the injection molding must be carried out at a temperature sufficient to activate the decomposition of the blowing agent.

Although the present invention is of particular interest with regard to solution polymerized hydrocarbon elastomers, as discussed above, it possesses utility with respect to thermoplastics generally. Polymeric substrates suitable for use include the homopolymers of 1,3-butadiene, or isoprene, and also butadiene/styrene copolymers, styrene/acrylonitrile copolymers, acrylonitrile/butadiene/styrene polymers and the like.

A particularly appropriate class of solution polymerized hydrocarbon elastomers of thermoplastic character are those polymers possessing structural features which afford them the properties of a vulcanized rubber without any cure treatment. These polymers are characteristically linear or radial block copolymers possessing as terminal blocks polymer segments of the type normally considered as thermoplastic, e.g., polystyrene, and possessing as internal blocks polymer segments of a type normally considered as elastomeric, e.g., polybutadiene, polyisoprene and the like. These polymers are conveniently made by solution polymerization techniques employing organolithium initiators. The linear forms can be made by sequential addition of the monomers or can be formed by coupling polymerlithium chains employing as a coupling agent a compound containing two sites reactive toward polymerlithium. The radial forms can be made by coupling polymerlithium chains employing as a coupling agent a compound containing three or more sites reactive toward polymerlithium. In practice, these elastomeric polymers can be conveniently molded to desired shapes by the technology of the thermoplastic polymer industry and the scrap from such fabrication operations is readily reusable.

In accordance with this invention, finely divided textile fibers, finely divided hydrocarbon polymers or blowing agents can be employed as gloss reducing additives.

Textile fibers of length of up to about 3 millimeters can be used. Examples of suitable fibers include natural fibrous stock such as cotton flock, wool fibers, linen fibers and the like and also synthetic fibers such as nylons, poly(ethylene terephthalate), polyacrylonitrile and the like as well as cellulose based fibers such as rayon. Incorporation of any amount of these fibers into injection moldable polymers can result in limiting the gloss of the polymer; however, for practical application the amount of textile fiber added will usually fall within the range of about 2 to about 30 parts by weight per hundred parts rubber (phr).

Suitable hydrocarbon polymers that can be employed are those that possess a maximum melting point of about 400° F (204° C). Examples include: both high density and low density polyethylene, crystalline polypropylene and ethylene-propylene copolymers among others. Suitable size for the finely divided polymers is in the range of about 5 microns to about 0.25 inch and the amount added, although any finite amount can affect gloss, will usually be within the range of about 5 to about 50 phr.

Blowing agents, as the term is herein employed, are compounds which thermally decompose in the temperature range of 250° to 450° F (121° to 232° C), preferably 350° to 400° F (177° to 204° C) without causing loss of the desirable properties of the rubber with which they are being employed. These blowing agents can be employed in quantities ranging from 0.05 to 1.0, preferably 0.05 to 0.5 phr. Examples of such compounds include 2,2'-azobis(2-methylpropylnitrile), N,N'-dinitrosopentamethyltetraamine, p,p'-oxybis(benzenesulfonyl hydrazide), urea, azodicarbonamide and the like. If the blowing agent is incorporated into the rubber by a mixing operation involving an internal mixer or a 2-roll mill, the blowing agent selected must be one possessing a decomposition temperature above that of the mixing operation. The blowing agent must also decompose at or below injection molding or extrusion temperatures. It is essential that the blowing agents decompose during the final molding or extrusion operation in order to provide the desired minute surface roughness required for a reduction in gloss.

In the practice of this invention, a small amount of a gloss-reducing additive is incorporated into the rubber prior to injection molding or extrusion. In one embodiment, the gloss-reducing additive is present with other compounding ingredients and the rubber in the composition charged for mixing in an internal mixer or on a 2-roll mill. As an alternative embodiment, if sufficiently small amounts of gloss-reducing additive are being employed, the additive can be added by dusting it onto the particles of compound that were obtained from the internal mixer or roll mill. In this embodiment, the mixing effect inherent in the operation of the injection or extrusion equipment provides adequate distribution of the additive throughout the polymer.

Either of the above defined alternative modes for introducing a gloss-reducing additive into the rubber are inherently simple ones which do not require any additional processing steps or operations. The resulting product has a pleasantly smooth and attractive, non-lustrous surface. No special processing equipment is involved such as, for example, a mold containing roughened surfaces to cast an article possessing light scattering surface irregularities nor are after-treatments required such as the abrading of a glossy surface to dull its appearance.

Conventional fillers, extenders, pigments, dyes, antioxidants, etc. can be added to the compositions of this invention.

EXAMPLE I

Cotton flock, low density polyethylene and zinc stearate were evaluated as gloss reducing agents in accordance with this invention employing the following recipe.

| RECIPE | |
|---|---|
| | phr[a] |
| Rubber[b] | 150 |
| Precipitated, hydrated silica[c] | 20 |
| Napthenic oil[d] | variable |
| Polystyrene | 60 |
| Aromatic polyindene resin[e] | 20 |
| Plastanox 2246[f] | 0.5 |
| Plastanox DLTDP[g] | 0.5 |
| Cotton flock, white[h] | variable |
| Zinc stearate | variable |
| Tenite 1830E[i] | variable |
| AC polyethylene 6[j] | variable |

[a] Parts by weight per hundred parts of rubber
[b] A 60 butadiene/40 styrene radial block copolymer synthesized by sequential monomer addition employing an organolithium initiator and, as branching agent, silicon tetrachloride whereby 75% of stoichiometric is added batchwise at the end of polymerization with the balance being added continuously over 5 to 10 minutes - said copolymer being extended with 50 php of naphthenic oil.
[c] HiSil 210, PPG Industries, Inc.
[d] Sunthene 250, Sun Oil Co.
[e] Picco 6100, Pennsylvania Industrial Chemical Corp.
[f] 2,2'-Methylenebis(4-methyl-6-t-butylphenol)
[g] Dilauryl thiodipropionate
[h] White No. 905, Claremont Flock Corp.
[i] Low density polyethylene, Eastman Chemical Products, Inc., sub. Eastman Kodak Company
[j] Low density polyethylene, Allied Chemical Plastics Div., Allied Chemical Corp.

In these runs, the respective mixture of blend components was combined in an internal mixer, the resulting blend was chopped into small pellets, a small portion of each blend was compression molded at 250° F (121° C) for 10 minutes and physical properties were determined with results tabulated below. The balance of each blend was injection molded and thereafter examined for surface gloss.

Results obtained are shown in Table I.

TABLE I

| Sample | Control | A | B | C | D | E |
|---|---|---|---|---|---|---|
| Naphthenic oil, phr | 70 | 70 | 70 | 60 | 70 | 60 |
| Cotton flock, phr | 0 | 10 | 5 | 0 | 0 | 0 |
| Zinc stearate, phr | 0 | 0 | 0 | 10 | 0 | 0 |
| Tenite 1830E, phr | 0 | 0 | 0 | 0 | 20 | 0 |
| AC PE 6, phr | 0 | 0 | 0 | 0 | 0 | 10 |
| Gloss[a] | 4 | 1 | 2 | 5 | 3 | 3 |
| Tensile strength, psi[b] | 650 | 605 | 580 | 570 | 640 | 700 |
| Elongation, %[b] | 510 | 480 | 495 | 550 | 460 | 500 |
| Shore A Hardness[c] | 39 | 46 | 43 | 39 | 53 | 44 |
| Abrasion Index, rev./0.1 in.[d] | 12 | 48 | 43 | 22 | 13 | 15 |

[a] 0 (dull), 1,2,3,4,5 (glossy) for injection molded specimen
[b] ASTM D 412-66
[c] ASTM D 2240-68
[d] ASTM D 1630-61

An effectiveness ranking in terms of gloss limitation would place cotton flock first with polyethylene also showing improvement over the control composition. Zinc stearate was not effective.

EXAMPLE II

A blowing agent, azodicarbonamide, was also evaluated as a gloss reducing agent. Three runs were made: (1) a control run absent azodicarbonamide, (2) a comparison run wherein azodicarbonamide was composited within the rubber compound by including it along with the blend components charged to the internal mixer, and (3) a comparison run wherein azodicarbonamide was dusted onto the surface of the pelleted compound obtained from an internal mixer relying, in this instance, on the mixing effects inherent in the operation of injection molding equipment. These runs were made in accordance with the following recipe.

| RECIPE | |
|---|---|
| | phr |
| Rubber[a] | 150 |
| Precipitated, hydrated silica | 20 |
| Naphthenic oil | 60 |
| Polystyrene | 60 |
| Substituted styrene resin[b] | 20 |
| Plastanox 2246 | 0.5 |
| Plastanox DLTDP | 0.5 |
| Azodicarbonamide | variable |

[a] See footnote b, Example I.
[b] Piccotex 100, Pennsylvania Industrial Chemical Corp.

In runs (1) and (2), the respective mixture of blend components was combined in an internal mixer, the resulting blend was chopped into small pellets, a small portion of the resulting blend was compression molded at 250° F (121° C) for 10 minutes and physical properties were determined with results tabulated below. The balance of said blend was injection molded and thereafter examined for surface gloss. In run (3), the azodicarbonamide was withheld until after the above chopping operation. The azodicarbonamide was then dusted into the pellets of the blend and the mixture was injection molded with subsequent examination of the molded object for surface gloss.

The results obtained are shown in Table II.

TABLE II

| Run | (1) | (2) | (3) |
|---|---|---|---|
| Sample | control | agent mixed with other blend components | agent dusted onto blend pellets prior to injection molding |
| Azodicarbonamide, phr | 0 | 0.3 | 0.3 |
| Appearance of injection molded specimen | glossy | dull | dull |
| Tensile, strength psi | 790 | 790 | (b) |
| Elongation, % | 530 | 520 | (b) |
| Shore A Hardness | 39.5 | 40 | (b) |
| Abrasion Index, | 60 | 62 | (b) |

TABLE II-continued

| Run | (1) | (2) | (3) |
|---|---|---|---|
| rev./0.1 in. | | | |

(b)Azodicarbonamide was not present as being blended through the mixture prior to injection molding. Tensile, strength etc. were not determined on injection molded specimens.

Clearly, the blowing agent was effective in reducing gloss under both conditions of run (2) and run (3).

I claim:

1. A method for limiting gloss of an injection molded elastomeric polymer said polymer being chosen from either linear or radial block copolymers which have thermoplastic blocks and elastomeric blocks with terminal blocks of thermoplastic said method comprising:
   (a) preparing an admixture of said injection moldable elastomeric polymer and an additive of finely divided textile fibers ranging in size up to about 3 millimeters in length, said additive being in an amount of about 2 to about 30 parts by weight per 100 parts of block copolymer effective to limit gloss of the molded polymer; and
   (b) injection molding an article from said admixture.

2. A method of claim 1 wherein said textile fibers are chosen from among cotton flock, wool fibers, linen fibers, nylon, poly(ethylene terphthalate), polyacrylonitrile and rayon.

3. A method of claim 2 wherein the textile fiber is cotton flock.

4. A method of claim 1 wherein said elastomeric polymer is linear block copolymer.

5. A method of claim 1 wherein said elastomeric polymer is radial block copolymer.

6. A method for limiting gloss of an injection molded, solution polymerized, elastomeric polymer said polymer being chosen from either linear or radial block copolymers which have elastomeric blocks of polybutadiene, polyisoprene, acrylonitrile, acrylonitrile/butadiene, or butadiene/styrene, with terminal thermoplastic blocks of styrene said method comprising:
   (a) preparing an admixture of said injection moldable elastomeric polymer and an additive of finely divided particles of hydrocarbon polymers chosen from among high density polyethylene, low density polyethylene, crystalline polypropylene and ethylene-propylene copolymers and ranging in size from about 5 microns to about 0.25 inch, said additive being in an amount of about 5 to about 50 parts by weight per hundred parts of moldable elastomeric polymer; and
   (b) injection molding an article of said admixture.

7. A method of claim 6 wherein the hydrocarbon polymer is low density polyethylene.

8. A method of claim 14 wherein said elastomeric polymer is linear block copolymer.

9. A method of claim 14 wherein said elastomeric polymer is radial block copolymer.

* * * * *

UNITED STATES PATENT AND TRADEMARK OFFICE
CERTIFICATE OF CORRECTION

PATENT NO. : 4,126,662
DATED : November 21, 1978
INVENTOR(S) : Terence C. Middlebrook It is certified that error appears in the above—identified patent and that said Letters Patent are hereby corrected as shown below:

Column 6, lines 27 & 29, "14" should be ---6---.

Signed and Sealed this

Twelfth Day of June 1979

[SEAL]

Attest:

RUTH C. MASON
*Attesting Officer*

DONALD W. BANNER
*Commissioner of Patents and Trademarks*